(12) United States Patent (10) Patent No.: US 8,246,339 B2
Luetgert et al. (45) Date of Patent: *Aug. 21, 2012

(54) DOOR SKIN, A METHOD OF ETCHING A PLATE, AND AN ETCHED PLATE FORMED THEREFROM

(75) Inventors: Kanne Luetgert, Geneva, IL (US);
Mark E. Richter, Cincinnati, OH (US);
William R. Immell, Fairfield, OH (US);
Stephen G. Huhn, Cincinnati, OH (US)

(73) Assignee: Masonite Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/071,986

(22) Filed: Mar. 25, 2011

(65) Prior Publication Data
US 2011/0212210 A1 Sep. 1, 2011

Related U.S. Application Data

(62) Division of application No. 12/054,587, filed on Mar. 25, 2008, now Pat. No. 7,959,817, which is a division of application No. 10/753,862, filed on Jan. 9, 2004, now Pat. No. 7,367,166.

(60) Provisional application No. 60/440,647, filed on Jan. 17, 2003.

(51) Int. Cl.
*B29C 59/02* (2006.01)
(52) U.S. Cl. ............. 425/385; 249/39; 249/55; 428/151
(58) Field of Classification Search .................. None
See application file for complete search history.

(56) References Cited

U.S. PATENT DOCUMENTS

| | | | | |
|---|---|---|---|---|
| 2,046,954 | A * | 7/1936 | La Verne Erwine et al. | 428/141 |
| 2,854,336 | A * | 9/1958 | Gutknecht | 430/323 |
| 3,770,479 | A * | 11/1973 | Dunning | 428/151 |
| 4,213,819 | A * | 7/1980 | Werthmann | 216/54 |
| 4,294,650 | A * | 10/1981 | Werthmann | 216/54 |
| 4,582,566 | A * | 4/1986 | Grey | 216/44 |
| 5,304,437 | A * | 4/1994 | Tennant | 430/5 |
| 5,472,828 | A * | 12/1995 | Akins et al. | 430/318 |
| 7,338,612 | B2 * | 3/2008 | Luetgert et al. | 216/29 |

* cited by examiner

*Primary Examiner* — Allan Olsen
(74) *Attorney, Agent, or Firm* — Berenato & White, LLC

(57) ABSTRACT

The present invention relates to a door skin comprising an exterior surface having outer portions lying on a first plane, spaced grooves recessed from the plane of the outer portions, and tonal portions having a planar area and a plurality of spaced depressions recessed from the plane of said planar area. The present invention is also directed to a method of etching a plate, for use with a molded die set, for embossing a wood grain pattern in the door skin, and the etched plate formed therefrom.

20 Claims, 5 Drawing Sheets

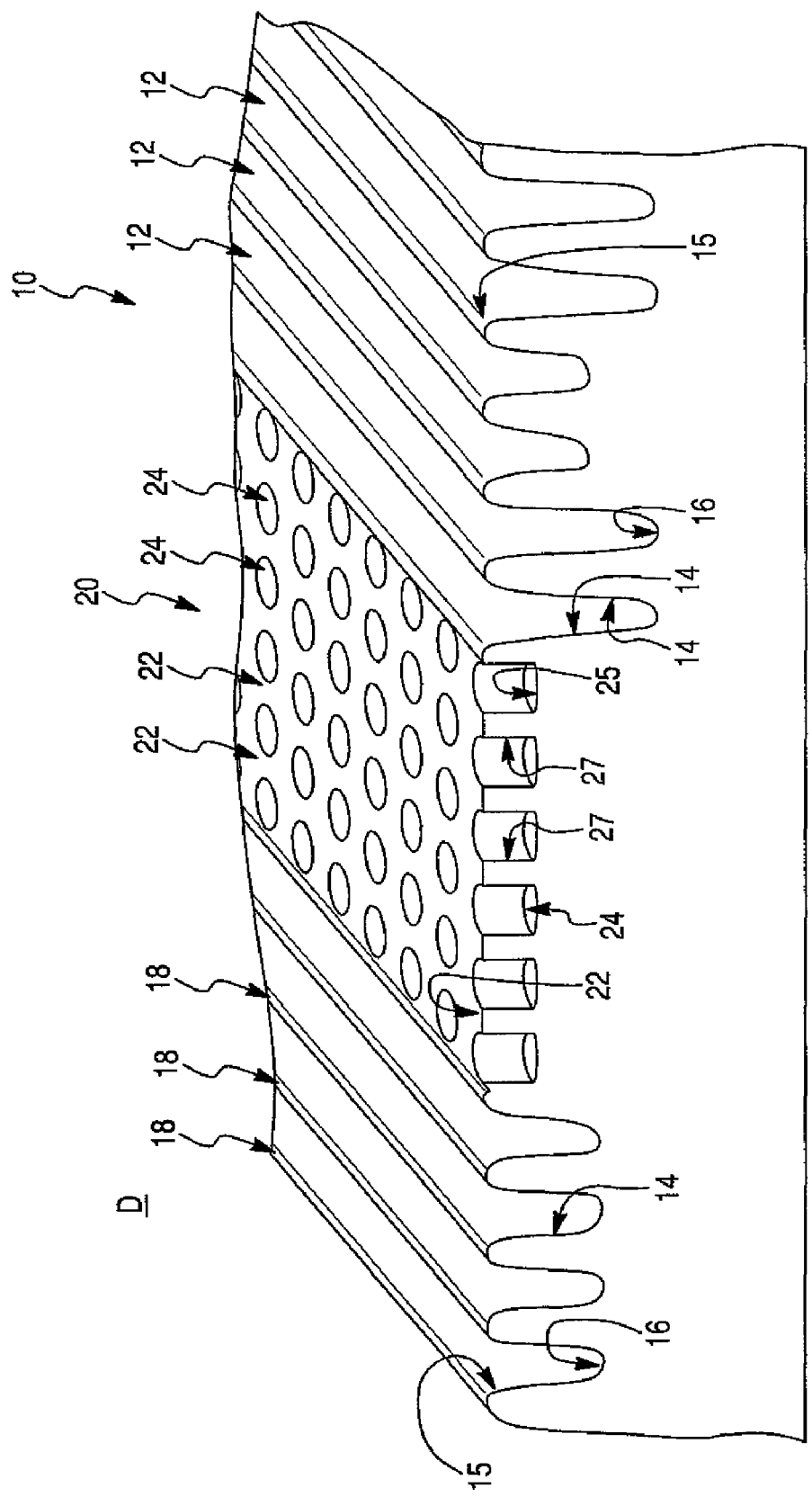

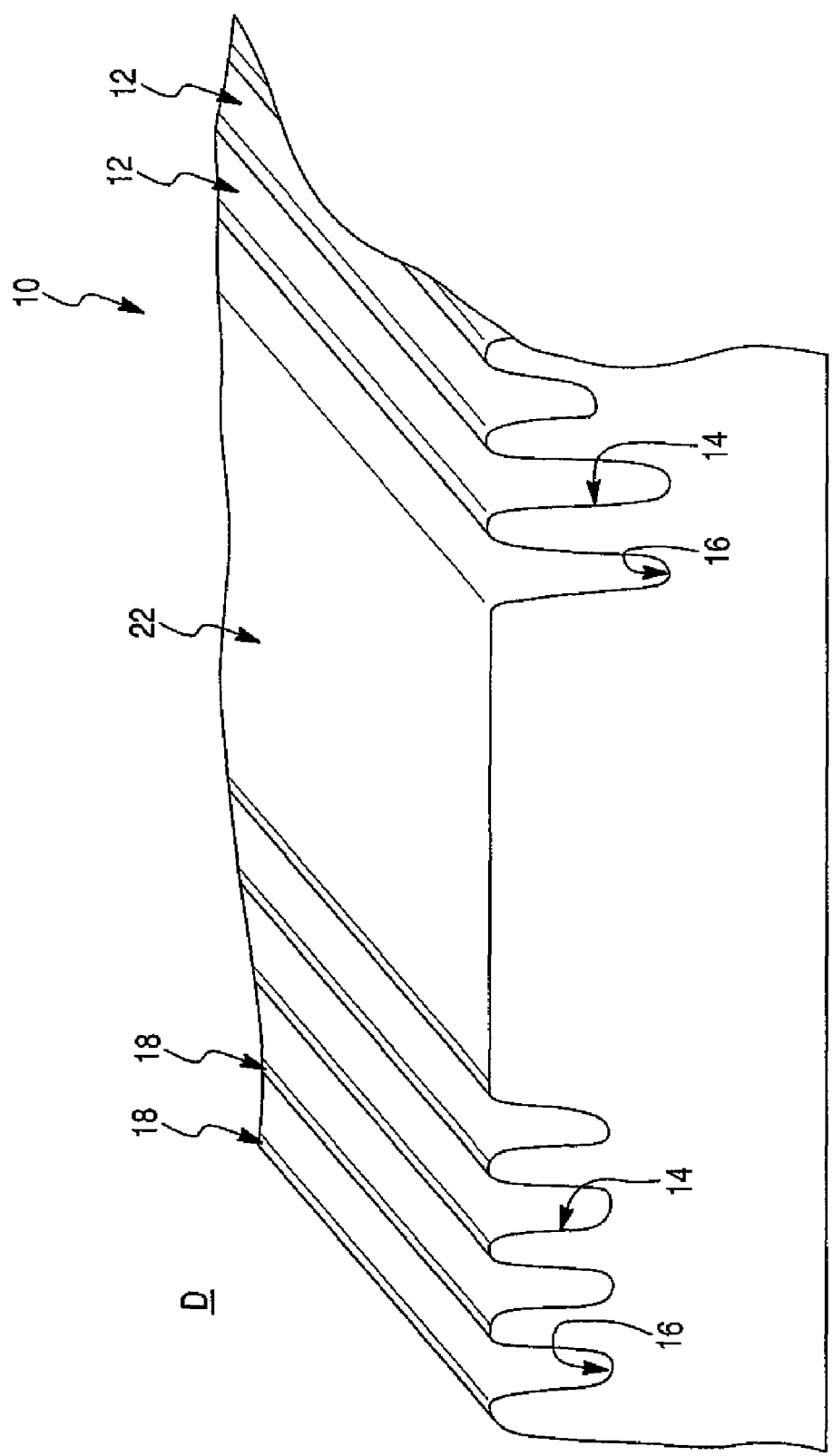

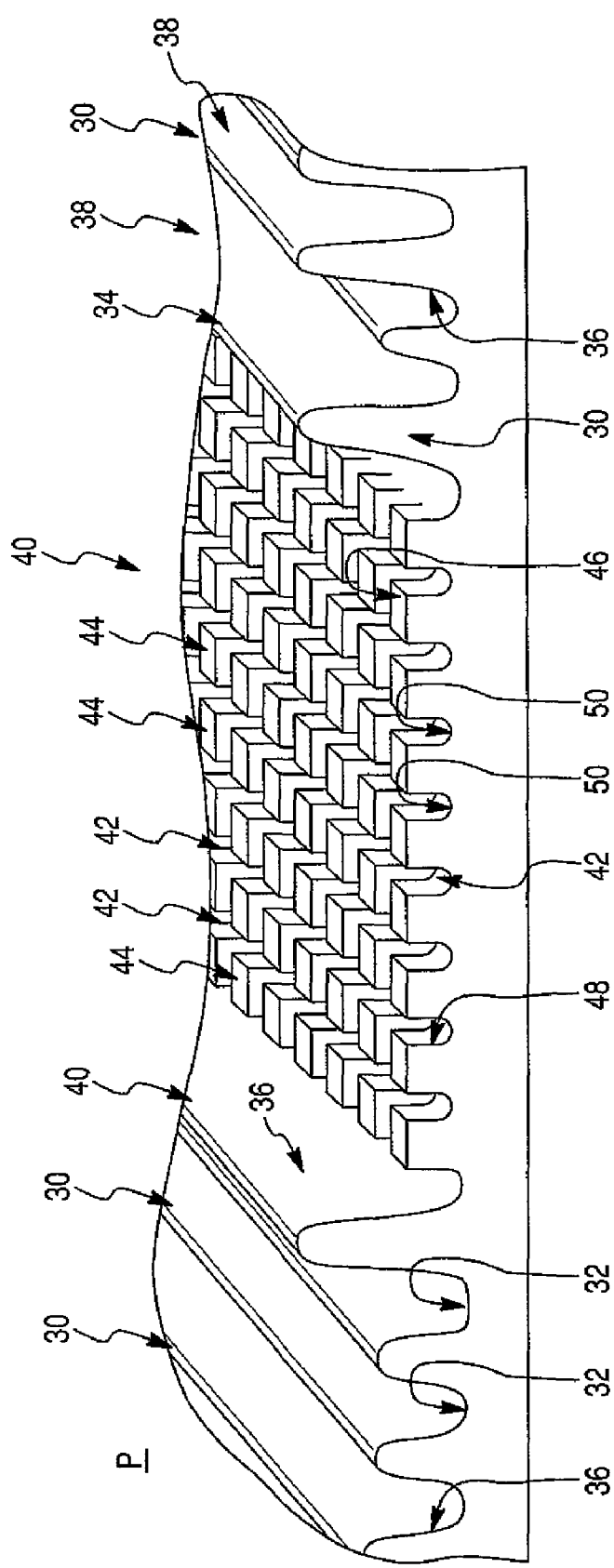

DOOR SKIN, A METHOD OF ETCHING A PLATE, AND AN ETCHED PLATE FORMED THEREFROM

CROSS-REFERENCE TO RELATED APPLICATIONS AND CLAIM TO PRIORITY

This application is a division of application Ser. No. 12/054,587 filed Mar. 25, 2008, now U.S. Pat. No. 7,959,817, which is a division of application Ser. No. 10/753,862 filed Jan. 9, 2004, now U.S. Pat. No. 7,367,166, which claims the benefit of priority of provisional application No. 60/440,647 filed Jan. 17, 2003, the disclosures of which are incorporated herein by reference and to which priority is claimed.

FIELD OF THE INVENTION

The present invention is directed to an interior or exterior passage door skin or other molded article, such as wainscot, cabinet doors, moldings, trim products, paneling, millwork or the like, having a naturally appearing wood grain pattern formed in an exterior surface. The exterior surface has outer portions lying on a first plane, spaced grooves recessed from the plane of the outer portions, and tonal portions simulating tonal changes as found in natural wood. The tonal portions have planar portions and a plurality of variably sized depressions recessed from the planar portions. The invention is also directed to a method of etching a plate, for use as an embossing plate or with a molded die set, for forming the wood grain pattern into the exterior surface of the door skin, a door formed from at least one and preferably two of the resulting door skins, and the resulting etched plate for providing an embossing plate or molded die set.

BACKGROUND OF THE INVENTION

Doors having compression molded door skins are well known in the art. Attempts have been made to provide a textured pattern on the exterior of the door skin to simulate the grain of natural wood. One such attempt provides a printed wood grain pattern on the door skin. However, the printed pattern has no depth or texture, as found in natural wood. The variable depth and texture found in natural wood provides a surface amenable to stain or other finishing. Therefore, staining and/or finishing is not possible with printed door skins. Furthermore, the print ink fails to simulate crisp wood grain ticks, and tick and background tonal variations.

Another attempt to simulate a natural wood grain pattern in the exterior surface of the door skin provides for transferring a photographic image of the grain pattern into an embossing plate, by an etching process, to form a lower surface with raised ridges extending therefrom in the embossing plate. Etching is a process whereby areas of a metal plate are covered with an acid resistant ground and an acid or mordant solution is applied to the plate. The areas that have no resistant ground are eaten away by the acid. An image or pattern is etched into the metal plate that then has a lower surface and a raised surface. Thus, the resistant ground, or "resist", controls where and how the acid eats into the metal plate. Chromed steel, copper and zinc are three most common metals used for embossing plates. Chromed steel is the hardest of the three metals, and will not wear down as quickly as non-steel plates after repeated embossing.

Different acids are necessary for etching different metals. In addition, there are different resists and ways of applying the resists. There are also various ways to expose the metal to the acid after the resist has been applied so that tone and texture can be created. Acid treatment of the plate then etches out the uncoated metal, creating a textured surface in the embossing plate. Raised lines or ridges are created by etching into the plate around lines of protective resist. The acid then eats away at the unprotected portions of the metal plate, leaving the raised lines or ridges. These lines create the illusion of wood grain ticks. The height of the lines is controlled by the width of the corresponding line of resist that is removed.

Conventional etched plates may be used as an embossing plate or with a molded die set, for embossing and forming a molded article having the pattern on its exterior surface. As known in the art, the pattern may be formed in the article's surface by embossing or using a molded die set, and subjecting a substrate to selected amounts of heat, pressure and time to form the molded article. When embossing a substrate to form a door skin having a wood grain pattern, the embossing plate is pressed into the material to provide bundles of wood ticks that form the grain pattern on the resulting door skin surface. A wood grain pattern is a cluster or bundle of spaced, raised lines of metal, or "ticks", which extend in a pattern simulating the appearance of wood. The ticks must be carefully spaced to simulate a natural wood grain.

During etching, it is often difficult to achieve clear, crisp wood ticks because as the acid eats into the metal around the ticks, thereby forming gaps, it also eats into the side walls of the ticks. If adjacent gaps (defining a tick therebetween) are too closely spaced, the acid may simply eat away at, and destroy the tick. As such, conventional etched plates having wood grain patterns do not emboss highly realistic wood ticks. In addition, such conventional etched plates often have sharp edges on the upper portions of the ticks, and undercuts at the bases of the gaps due to the nature of the etching process. If the gaps are etched too deep, undercutting often results since the acid has longer to eat away at the side walls of adjacent ticks as the gaps get deeper, as compared to etching shallower gaps that do not require as much exposure time to the acid.

In addition, conventional door skins with embossed wood grain patterns fail to capture the subtle wood tone variations found in natural wood. Natural wood includes not only wood ticks, but varying background tones as well. It is the background tones and sharp, crisp ticks found in natural wood that provides the aesthetically appealing appearance, and that enables it to be easily stained or finished. Conventional embossing plates used to form door skins with wood grain patterns fail to capture both naturally appearing wood ticks and wood tones. If the door skin surface is stained, it does not appear realistic. As commonly known in the art, stains include a dye or pigment in solution, and are generally used to color a wood by penetrating the wood surface. As such, the natural wood tones and ticks may be enhanced or colored, without marring the wood surface textures and tones, as with paint.

Stains do not penetrate the surface of a composite or polymeric door skin in the same manner as natural wood. Therefore, attempts to stain a composite or polymeric door skin for purposes of enhancing tones and ticks is a difficult process for a typical consumer. The stain may not simply be applied with a brush or rag, and the excess wiped off, as can be done with natural wood. Rather, such door skins typically require multiple applications of stain, which must then be selectively removed by hand. This technique often requires a professional or one experienced in staining in order to capture a natural wood appearance. Alternatively, portions of the door skin surface may be highlighted by spray gun application of the stain, or other shading material. The door skin surface may be evenly sprayed, resulting in an unnatural, monotone appearance. Even if the stain is carefully applied in specific areas, the resulting tones and wood ticks may appear splotchy and unrealistic if careful highlighting is not achieved. The average homeowner or consumer is not sufficiently skilled to stain or finish such a molded door skin, and achieve a realistic wood grain appearance using commercial stain finishing products.

Therefore, there is a need for a molded door skin having a wood grain pattern that may be easily stained, and that precisely captures both the wood ticks and wood tones found in natural wood grain.

SUMMARY OF THE INVENTION

The present invention is directed to a molded door skin comprising an exterior surface having outer portions lying on a first plane, spaced grooves recessed from the plane of said outer portions, and tonal portions. Each of tonal portions has a planar area and a plurality of spaced depressions recessed from the plane of the planar area.

A method of etching a wood grain pattern into a plate comprises the steps of: providing an image of a piece of wood having ticks and background tones; providing a metal plate; applying acid resist on a surface of the plate; laser ablating the resist according to a tick image derived from the image; applying acid to the plate to form ticks having a first height; repeating said applying acid resist, said laser ablating and said applying acid steps to form other ticks having a second height, wherein the second height differs from the first height; applying acid resist on the surface of the etched plate; laser ablating the resist according to a tonal image derived from the image; and applying acid to the plate, thereby etching the plate and forming the tonal pattern in the plate.

The present invention also relates to an etched plate for forming a wood grain pattern into a composition material. The etched plate has lower portions lying on a first plane, spaced ticks extending from the plane of the lower portions, and tonal areas. The tonal areas have a plurality of recessed channels, wherein said channels define a plurality of spaced protrusions.

A molded construction component comprises an exterior surface having outer portions lying on a first plane, spaced grooves recessed from the plane of the outer portions, and tonal portions. Each tonal portion has a planar area and a plurality of spaced depressions recessed from the plane of the planar area.

A door comprises a peripheral frame, and at least one door skin, wherein the door skin has an exterior surface with outer portions lying on a first plane, spaced grooves recessed from the plane of the outer portions, and tonal portions. Each tonal portion has a planar area and a plurality of spaced depressions recessed from the plane of the planar area.

BRIEF DESCRIPTION OF THE FIGURES

FIG. 3 is an enlarged perspective view of the circled portion 3-3 of FIG. 1; and FIG. 4 is a fragmentary perspective view of an etched metal plate according to the present invention.

DETAILED DESCRIPTION OF THE INVENTION

Figure 1:
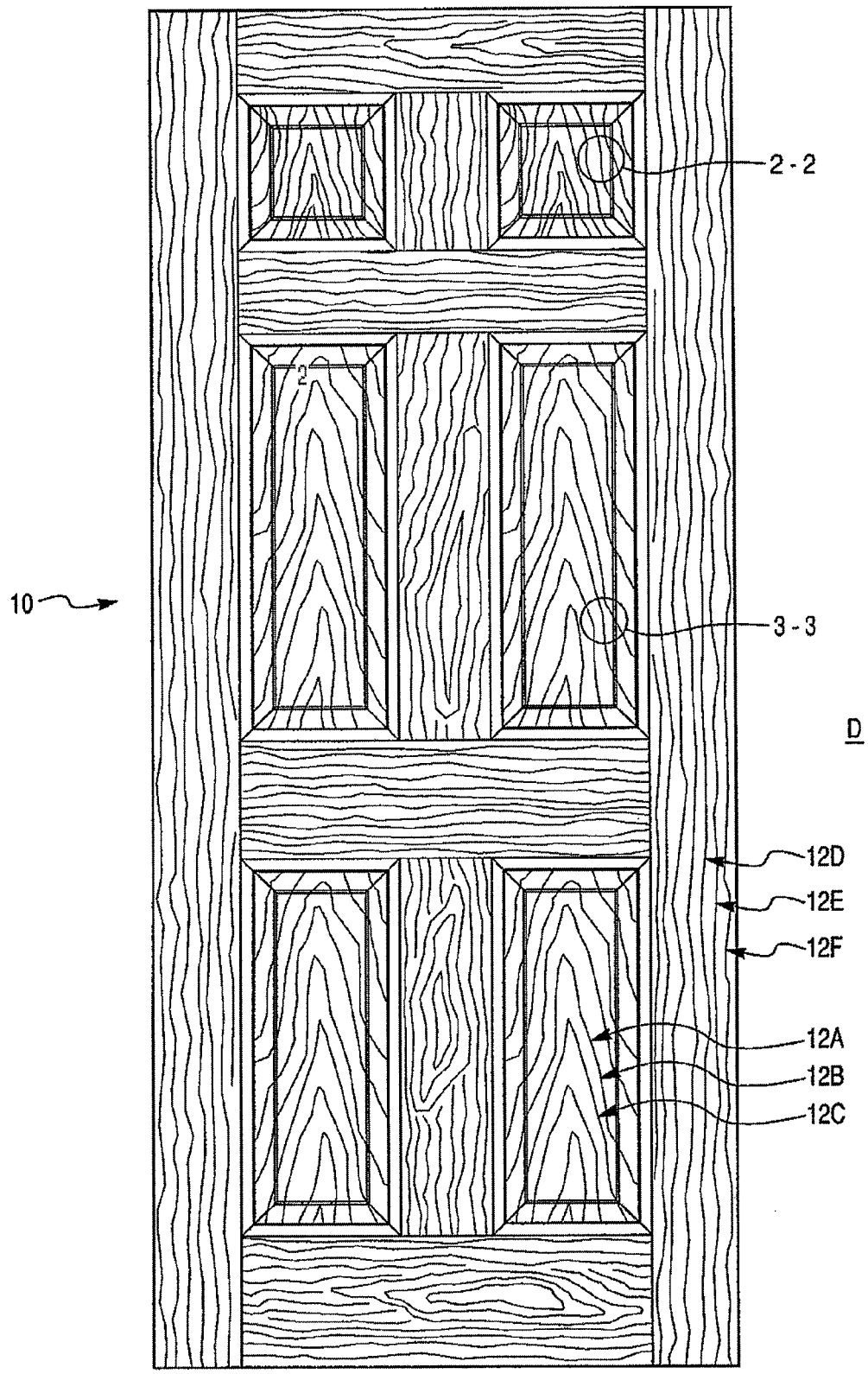
FIG. 1 is a front elevational view of a door skin having a wood grain pattern according to the present invention.
Figure 2:
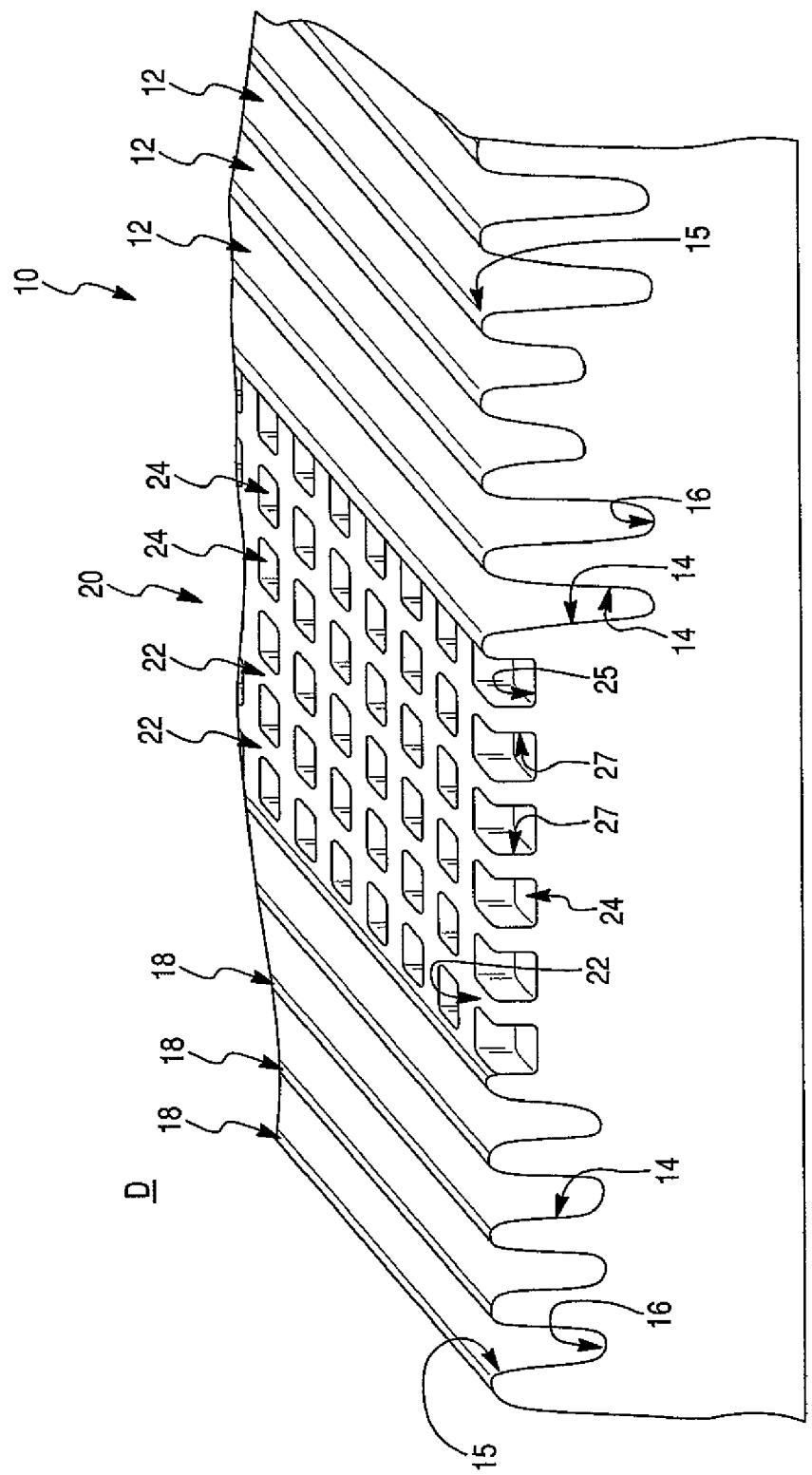
FIG. 2 is an enlarged perspective view of the circled portion 2-2 of FIG. 1.

The present invention is directed to a door skin D having a naturally appearing wood grain pattern formed in an exterior surface 10, as best shown in FIG. 1. The wood grain pattern may be formed using an etched plate, such as in an embossing plate or molded die set, or other process known in the art. As best shown in FIG. 2, exterior surface 10 of door skin D comprises a plurality of spaced grooves 12 that are formed into exterior surface 10, and simulate wood ticks as found in natural wood. Each one of grooves 12 is defined by opposing walls 14 and a base 16. A plurality of outer portions 18 lie on a first plane that includes the most exteriorly disposed surfaces of exterior surface 10. Interfaces 15 interconnect and are integral with outer portions 18 and walls 14. Preferably, interfaces 15 are curved. Outer portions 18 separate adjacent grooves 12. Preferably, grooves 12 are recessed from the first plane from between about 0.005 inches to about 0.015 inches, and may have variable widths and depths. As such, outer portions 18 may also have variable widths, as best shown in FIG. 2. The depth of grooves 12 may vary beyond this range depending on the substrate used to form door D, as well as the wood species being simulated. For purposes of explanation, the depths described herein simulate a wood grain pattern such as found in ash wood.

Adjacent grooves 12 may be spaced from each other by variable distances, and extend longitudinally relative to each other by variable lengths, as shown in FIG. 1. Grooves 12A, 12B and 12C are spaced from each other, extending in an arrowhead-like configuration, as may be found in natural wood. Grooves 12D, 12E and 12F extend longitudinally, extending the entire length of door D. It should be understood that the configuration of grooves 12 simulates natural wood. As such, while some grooves 12 may extend substantially parallel and spaced a predetermined distance, they need not, as shown in FIG. 1. Thus, the configuration of grooves 12 simulates an appearance of soft, flowing wood ticks.

In addition, exterior surface 10 includes tonal portions 20. Each one of tonal portions 20 includes a planar area 22, and a plurality of spaced depressions 24 recessed from the plane of planar area 22. Each one of depressions 24 includes a base 25 and sides 27. As shown in FIG. 2, depressions 24 appear as open box-like recesses, or pockets, having a substantially square configuration. However, depressions 24 may also have a cylindrical configuration. The bases 25 of depressions 24 are preferably recessed from the plane of planar area 22 from between about 0.001 inches to about 0.003 inches. However, the depth of depressions 24 may vary beyond this range depending on the substrate used to form door D, and the wood species being simulated. Preferably, depressions 24 are recessed from the plane of planar areas 22 by about the same depth throughout exterior surface 10. Planar areas 22 preferably lie on a plane that is coplanar with the plane of outer portions 18. Alternatively, planar areas 22 may be slightly recessed from the plane of outer portions 18.

Depressions 24 are variably spaced throughout planar areas 22, and may also be variably sized. As such, the density and size of depressions 24 in one planar area 22 may differ from the density of depressions 24 in another planar area. When stain is applied to exterior surface 10, larger depressions 24 retain more stain than smaller depressions 24, resulting in a darker tonal area in a planar area 22 having larger depressions 24. Furthermore, a planar portion 22 having a relatively high density of depressions 24 retains more stain than a planar portion 22 having a relatively low density of depressions 24. Again, a higher density of depressions 24 create a darker tonal area on exterior surface 10. In this way, tonal variations are precisely controlled, achieving subtle background tones as found in natural wood. In addition, some planar areas 22 may include no depressions 24, as best shown in FIG. 3. This provides a bi-color or glossy appearance after stain is applied to exterior surface 10.

Therefore, exterior surface 10 of door skin D includes a plurality of grooves 12 and tonal portions 20, which together simulate wood ticks and background wood tones as found in a natural wood grain. When stain is applied to exterior surface 10, varying amounts of stain accumulate in grooves 12, since grooves 12 are variably spaced and have variable widths and depths. Deeper, wider grooves 12 hold more stain as compared to shallower, narrower grooves 12. In this way, deeper grooves 12 simulate darker, more prominent wood ticks. Similarly, shallower grooves 12 simulate lighter, more delicate wood ticks. Likewise, a tonal portion 20 having a high density of depressions 24, or larger depressions 24, retains more stain as compared to a tonal portion 20 having a lower density of depressions, or smaller depressions. The more stain that is retained in a tonal portion 20, the darker the area will appear. Thus, varying tonal portions 20 simulate varying wood tones, depending on the density and size of depressions 24.

Stain may be easily applied to exterior surface 10 of door D by an end user by simply wiping the stain on exterior surface 10. The integration and configuration of grooves 12 and tonal portions 20 allow the stain to be simply wiped or brushed on by the consumer. The stain clings and congeals in the recessed areas creating small pools of stain. The varying depths and sizes of grooves 12 and depressions 24 create tonal variations more closely approximating natural wood. Excess stain is then wiped off. Thus, stain is applied to the disclosed molded door skin D in the same manner as it is applied to natural wood. Furthermore, only one coat of stain may be required, depending on the preference of the end user. Preferably, a heavily pigmented stain is used, which will easily cling and congeal in grooves 12 and tonal portions 20.

The present invention is also directed to an etched plate P, for use as an embossing plate or with a molded die set, for forming a wood grain pattern in the exterior surface of a molded article, such as door skin D. As best shown in FIG. 4, a metal plate P includes multi-level ticks integrated with tonal areas. Specifically, plate P includes a plurality of etched ticks 30 extending upwardly from lower portions 32, wherein lower portions 32 lie on a plane that include the deepest etched surfaces of metal plate P. Ticks 30 have a ridge-like configuration, and vary in height from between about 0.005 inches to about 0.015 inches. The height of ticks 30 may vary depending on the particular wood species that is being simulated. Each one of ticks 30 includes an upper ridge 34, and walls 36 extending from upper ridge 34 to lower portions 32. Adjacent ticks 30 are separated by gaps 38, which are etched into plate P to define ticks 30. Plate P has an inverse configuration to the exterior surface being formed in door D. For example, ticks 30 correspond to grooves 12 of door D, and the plane of lower portions 32 corresponds to the first plane of outer portions 18 (and planar area 22).

Plate P also includes tonal areas 40, which correspond to tonal portions 20. For example, tonal areas 40 correspond to tonal portions 20 of door skin D. Tonal areas 40 include a plurality of recessed channels 42. Channels 42 are configured in a grid-like pattern, define a plurality of spaced protrusions 44. Spaced protrusions 44 are preferably box-shaped in configuration (as defined by the grid-like pattern of channels 42). However, spaced protrusions 44 need not be box-shaped. For example, tonal areas 40 may include a plurality of cylindrically-shaped protrusions 44. Each one of spaced protrusions 44 includes a flat top 46, and sides 48 extending from and integral with flat top 46 and a base 50 of channels 42. Bases 50 of channels 42 are preferably coplanar with the plane of lower portions 32. Alternatively, bases 50 of channels 42 may be slightly raised above lower portions 32.

Spaced protrusions 44 extend upwardly from channels 42 to a height of between about 0.001 inches to about 0.003 inches. The density, size and spacing of protrusions 44 in a given tonal area 40 are variable. In this way, variously sized and spaced depressions 24 are formed in tonal portions 20 (through embossing or molding), resulting in tonal variations in exterior surface 10 of door skin D (or other molded article) when stain is applied. Thus, protrusions 44 create depressions 24 that act as pockets or cells to retain stain. Similarly, ticks 30 create grooves 24 of variable depths and widths (since ticks 30 have variable heights and widths). Deeper, wider ticks 30 create deeper, wider grooves 12, which retain more stain than shallower, narrower grooves 12. Thus, tick colorations and tones, as well as background tones, are precisely controlled using the disclosed etched plate. The textured surface created by plate P simulates the surface of natural wood, forming molded articles having a textured surface that is easily stainable, wherein the stain may be simply wiped on by the consumer in one stain application.

The present invention also relates to a method of etching a plate, for use as an embossing plate or molded die set, for forming a molded article, such as door skin D, with a naturally appearing wood grain pattern formed in an exterior surface of the molded article. First, natural wood planks having a desired wood grain pattern are selected. The planks may be any desired species of wood. Preferably, each wood plank is a component of a door or panel that is to be simulated by the molded article, such as a stile, rail or panel. The planks are photographed, preferably digitally, to derive the actual texture, tone and wood grain pattern of the natural wood plank. To enhance the image of the ticks and tones, the planks may be sanded and finished with a clear lacquer coat before photographing.

After capturing the images of several wood planks representing all of the components of the molded article, the resulting images are digitally "assembled" to create an image of a door, a panel, or the like. For example, images of planks corresponding to stiles, rails and panels may be digitally aligned to create an image of a door. This door layout image will provide the wood grain pattern for the molded door skin. The planks may be of different wood species, so that the stiles and rails may simulate one species and the panels another species. In addition, the wood grain pattern of each plank may be oriented as desired when assembling the door layout image. The resulting door layout image has a highly realistic wood grain pattern, with the wood grain of the stiles oriented perpendicular to that of the rails, and the wood grain of the panel(s) oriented as desired. Alternatively, the wood grain image may be formed only in the flat surface areas of the door skin D, and not in the molded contour portions. Thus, an image of how a door would appear if actually constructed from the natural wood planks is digitally constructed. Alternatively, the wood planks comprising all of the door components (i.e. stiles, rails and panels) may be arranged as if the door were constructed, and an image of the entire plank layout captured.

The resulting layout image is separated by computer software, such as available with Photoshop™ into a series of layering images. Each layering image is an image of the ticks, wherein widths have been adjusted based on tick depth (in the wood planks). The depth of the ticks from the wood planks is determined by a computer program, which correlates the shades and colorations of ticks in the initial layout image to a particular tick depth. The deepest ticks from the planks (i.e. ticks having the darkest, widest appearance in the initial image) are formed having the greatest height (relative to lower portions 32) during the etching process. Preferably, the ticks range in height relative to the deepest etched portions of a metal plate P from between about 0.005 inches to about 0.015 inches. This is the preferred range if simulating a wood species such as ash. This range may vary depending on the substrate being molded and the species of wood being simulated. The total etching depth (i.e. corresponding to the tick height range) is therefore predetermined.

Preferably, the initial layering image is separated into at least 2 layering images, more preferably at three layering images. However, it should be understood that more layering images may be used, such as eight layering images. Each layering image corresponds to an etching cycle. Thus, the more layering images that are used, the more etching cycles the plate undergoes.

When simulating a wood species such as ash, three layering images are preferred. The first layering image is an image of only the deepest ticks (as determined by the computer). The second layering image is an image of the same tick pattern of the first layering image, but the image has been modified to narrow the ticks in the image. As known in the art, the depth of a particularly etching cycle (and therefore height of the ticks being formed) is a function of the width of resist protecting the ticks. Similarly, the width of the ticks is controlled by controlling resist removal. Thus, the number of etching cycles, and resist removal, is correlated to the particularly type of wood species being simulated. For example, oak has relatively wide ticks, and the etch depth for the ticks can therefore be greater than for the relatively thin ash ticks.

In a preferred embodiment for simulating a wood species such as ash, the initial image is separated into three layering images and four etching cycles to create ticks 30. Using four etching cycles, ticks 30 are gradually etched into plate P. Preferably, metal plate P is copper. Copper has an extremely fine micrograin structure and therefore allows for precision etching, forming closely spaced, narrow ticks 30. More preferably, 20 gauge copper is used. However, other metals may be used, such as aluminum, cold rolled steel and stainless steel. After the plate is etched, it may then be attached to a steel die to provide support when used as an embossing plate, or with a molded die set. The metal shell may be fastened mechanically to the steel die face. Alternatively, etched components may be attached to a steel die or mold.

Prior to etching, the plate is thoroughly cleaned. Then, a first resist coating is applied to the surface of the plate. Preferably, the resist is a lacquer-based resist, such as that used by Wood Graphics of Cincinnati, Ohio. The resist is sprayed onto the surface of the plate to a thickness of about 4-6 microns. After the plate has been prepared with the resist, an image corresponding to the first layering image is laser ablated into the resist. The first image is an image of the deepest ticks. The resist may be precisely removed using the laser. The coated plate is then subjected to acid. Preferably, a ferric chloride based acid is sprayed onto the surface of the plate, such as that used by Wood Graphics of Cincinnati, Ohio. It should be noted, however, that the type of acid used varies depending on the type of metal being etched. A first level of etching eats into the surface of the plate to a depth of about 0.004 inches. As known in the art, the amount of time required for acid etching is a function of depth desired, as well as the strength of acid used. After the first etching cycle is complete, the plate is thoroughly cleaned with an alcohol-based cleaner to remove any remaining resist or etching residue.

The plate is then subjected to an acid bath. Preferably, a ferric chloride based acid is used, as used in for the first etching cycle. The acid bath rounds off any sharp edges formed during the first level of etching. Preferably, any sharp edges are rounded down (i.e. eaten away by the acid) by about 0.001 inches.

The plate is then washed to remove any acid and/or particulates, and prepared for the second etching cycle. Preferably, the resist and acid used for the all etching cycles is the same. A second resist coating is applied to the plate, covering the entire surface of the plate (including portions that were etched in the first etching cycle). Thereafter, an image corresponding to a second layering image is laser ablated into the resist. The second layering image is an image of the tick pattern from the first layering image, but the ticks have been narrowed (i.e. the resulting ticks have reduced widths). The laser ablation removes the resist according to the pattern of the second layering image. Because the ticks are narrowed in the second layering image (compared to the first layering image), only the resist at the base of the ticks previously etched is removed, leaving resist on the sides of the ticks protected, such as side walls 36. This exposes the lower portion (i.e. 32) of the gaps (i.e. 38) being etched, so that etching may continue in those areas (i.e. resulting in deeper gaps). However, the resist coats and protects the sidewalls of the ticks being formed, which ultimately creates delicate, closely spaced ticks. In addition, undercutting is eliminated, since the sides 36 are protected. Thus, the bases of the deeper gaps are exposed for continued etching, thereby increasing the height of ticks (for deeper embossing). The second etching cycle etches into the plate an additional 0.003 inches.

The plate is again cleaned and prepared for the third etching cycle. A third resist coating is applied, preferably the same resist as used in the other etching cycles. The second layering image is used as a pattern for resist removal during the third etching cycle. The resist is again laser ablated according to the second layering image, and the plate is etched an additional depth of 0.004 inches.

Then, the plate is again thoroughly cleaned, and the plate is subjected to a fourth etching cycle. The third layering image is used as a pattern for resist removal during the fourth etching cycle. The third layering image is an image of the deeper ticks, as well as the shallower ticks. Therefore, the bases of the deeper gaps (defining the highest ticks) are increased. In addition, shallower gaps (defining ticks having a lower height) are etched into the metal, thereby creating a multi-level tick configuration. Resist is removed by laser ablation, as described above, and the plate is subjected to acid. The fourth etching level eats into the plate an additional 0.002 inches.

During the four etching cycles described above, planar areas are also etched into the metal, which will correspond to tonal portions 40. As such, these planar areas are etched to a depth of between about 0.012 inches to about 0.014 inches (which is the total depth etched during etching cycles 1-4).

A fifth and final etching level completes the etching process. However, this final etching process is unique in that a different image is used as the pattern for resist removal. Specifically, the plate is subjected to a gravure screen etching process to create tonal portions 40, and finalize the depth of gaps 38 defining ticks 30. The screen process uses the initial layout image described above, combined with a gravure screen to create a screened image. The screen permits a digital manipulation of the initial image, wherein the initial image is broken down into a plurality of variably sized squares, much like a grid overlying an image. The grid is not composed of equally sized and spaced squares. Rather, larger sized squares correspond to darker areas of the initial image. The darker the density of the image, the larger the size of the square, and vice versa. Preferably, a screen having 133 to 200 lines per inch is used, more preferably a 150 line screen is used for simulating a wood grain pattern such as ash wood. A 200 line screen provides increased detail in the etching process. However, a screen having fewer lines per inch, such as a 133 line screen, may provide a better release from the metal die after the door skin is embossed and pressed. The resulting screened image includes a series of squares corresponding to tonal variations in the initial image. Darker tones correspond to larger squares having a higher density in a given area. Lighter tones correspond to smaller squares having a relatively lower density in the given area.

Before etching the plate in the fifth etching cycle, the plate is again cleaned to remove any remaining resist or particulates. Then, the plate is coated with resist, which is preferably the same resist as used for the other etching cycles described above. The resist is removed according to the pattern provided by the screen image, and removed by laser ablation. In the areas forming tonal portions 40, the resist is removed in areas corresponding to channels 42, leaving squares of resist (thereby creating protrusions 44). In the areas forming ticks, all resist is removed except for lines of resist protecting those ticks having the greatest height. The etched plate is then subjected to a fifth acid etching cycle, eating into the plate an additional depth of between about 0.001 inches to about 0.003 inches. Preferably, this is the final etching cycle. However, the plate may be subjected to two relatively short screen etching cycles.

The five etching cycles create a multi-level structure in the plate, and achieve delicate, closely spaced ticks. Preferably, the plate is etched to a depth of 0.005 inches or less during each etching cycle. (As noted, acid etching time is a function of depth). In this way, undercutting of the ticks is eliminated. In addition, well defined, closely spaced ticks are formed.

The etched plate, for use as an embossing plate or with a molded die set, forms a molded article, such as door skin D, having a surface that precisely simulates the qualities of natural wood. Although the disclosed wood grain pattern has been described with reference to a molded door skin D, it should be understood that the present invention is applicable to a wide range of molded and/or embossed articles, such as cabinet doors, furniture doors, millwork, wainscot, paneling, construction components, decorative moldings, trim products, and the like.

In addition, the disclosed depths and heights of surfaces described herein are the preferred ranges for simulating a wood grain pattern such as food in ash wood. It should be understood that these preferred ranges may vary depending on the substrate used to form the molded article, and the species of wood being simulated. For example, it may be desirable to increase tick and tonal depths when forming an article molded from a harder substrate, such as hardboard, in order to achieve the desired tonal variations.

Preferably, the molded article is compressed from a polymer-based composite, such as sheet molding compound ("SMC"), polystyrene or polypropylene. However, other substrates may be pressed or embossed with the disclosed etched die, including medium density fiberboard, hardboard, fiberboard, steel, other wood composite materials, and other thermoplastic materials.

It will be apparent to one of ordinary skill in the art that various modifications and variations can be made in construction or configuration of the present invention without departing from the scope or spirit of the invention. Thus, it is intended that the present invention cover all modifications and variations of the invention, provided they come within the scope of the following claims and their equivalents.

What is claimed is:

1. An etched plate for forming a wood grain pattern into a composition material, comprising:
    an etched metal plate having lower portions lying on a first plane;
    spaced ticks extending from the plane of said lower portions; and
    tonal areas having a plurality of channels, said channels defining a plurality of spaced protrusions.

2. The etched plate of claim 1, wherein the plate is selected from the group consisting of copper, aluminum, cold rolled steel, and stainless steel.

3. The etched plate of claim 1, wherein the plate is 20 gauge copper.

4. The etched plate of claim 1, wherein said spaced ticks extend from the plane of said lower portions from between about 0.005 inches and 0.015 inches.

5. The etched plate of claim 1, wherein said spaced ticks are variably spaced from each other.

6. The etched plate of claim 1, wherein said spaced ticks extend longitudinally relative to each other.

7. The etched plate of claim 1, wherein said spaced ticks have variable lengths.

8. The etched plate of claim 1, wherein said tonal areas have differing densities of said protrusions.

9. The etched plate of claim 1, wherein the plate is fastened to a steel die face.

10. The etched plate of claim 1, wherein said channels have bases that are coplanar with the plane of said lower portions.

11. The etched plate of claim 10, wherein said protrusions extend from the plane of said bases from between about 0.001 to about 0.003 inches.

12. An etched plate for molding a molded door skin, the etched plate comprising:
    an etched plate body comprising a plate surface with an inverse configuration to an exterior face of a molded door skin, the exterior face of the molded door skin having outer portions lying on a first plane, spaced grooves recessed from the first plane of the outer portions to simulate an appearance of wood ticks in the molded door skin, and tonal portions formed in the exterior face of the molded door skin and having a planar area and a plurality of spaced depressions recessed from the plane of the planar area for retaining stain and simulating an appearance of wood background tone of the molded door skin.

13. The etched plate of claim 12, wherein the spaced grooves of the molded door skin of which the etched plate has an inverse relationship are variably spaced from each other.

14. The etched plate of claim 12, wherein the spaced grooves of the molded door skin of which the etched plate has an inverse relationship extend longitudinally relative to each other.

15. The etched plate of claim 12, wherein the plane of the planar area of the molded door skin of which the etched plate has an inverse relationship is coplanar with the first plane of the outer portions.

16. The etched plate of claim 12, wherein the spaced grooves of the molded door skin of which the etched plate has an inverse relationship have variable depths relative to the plane of the outer portions.

17. The etched plate of claim 16, wherein the spaced grooves of variable depths of the molded door skin of which the etched plate has an inverse relationship are recessed from the plane of the outer portions from between about 0.005 inch to about 0.015 inch.

18. The etched plate of claim 12, wherein the spaced depressions of the molded door skin of which the etched plate has an inverse relationship are arranged in a grid pattern in plan view.

19. The etched plate of claim 18, wherein the spaced depressions of the molded door skin of which the etched plate has an inverse relationship are substantially square in configuration.

20. The etched plate of claim 18, wherein the spaced depressions of the molded door skin of which the etched plate has an inverse relationship are substantially cylindrical in configuration.

* * * * *